(12) United States Patent
Hoff

(10) Patent No.: US 8,098,048 B2
(45) Date of Patent: Jan. 17, 2012

(54) BATTERY CHARGER WITH INTEGRATED CELL BALANCING

(75) Inventor: Michael Hoff, Boxborough, MA (US)

(73) Assignee: The Gillette Company, Boston, MA (US)

( * ) Notice: Subject to any disclaimer, the term of this patent is extended or adjusted under 35 U.S.C. 154(b) by 648 days.

(21) Appl. No.: 12/136,909

(22) Filed: Jun. 11, 2008

(65) Prior Publication Data

US 2008/0309286 A1    Dec. 18, 2008

Related U.S. Application Data

(60) Provisional application No. 60/944,150, filed on Jun. 15, 2007.

(51) Int. Cl.
*H02J 7/00* (2006.01)
*H02J 7/04* (2006.01)

(52) U.S. Cl. ........ 320/120; 320/116; 320/118; 320/119; 320/162

(58) Field of Classification Search .................. 320/120, 320/162, 116, 118, 119
See application file for complete search history.

(56) References Cited

U.S. PATENT DOCUMENTS

| | | | |
|---|---|---|---|
| 345,124 A | | 7/1886 | De Virloy et al. |
| 5,387,857 A | * | 2/1995 | Honda et al. ................. 320/120 |
| 5,504,415 A | * | 4/1996 | Podrazhansky et al. ...... 320/118 |
| 5,583,415 A | * | 12/1996 | Fernandez et al. ............ 320/121 |
| 5,619,116 A | * | 4/1997 | Takano et al. ................. 320/116 |
| 5,773,959 A | * | 6/1998 | Merritt et al. ................. 320/120 |
| 7,288,919 B2 | * | 10/2007 | Morita ........................... 320/116 |
| 7,352,155 B2 | * | 4/2008 | Li et al. ......................... 320/118 |
| 7,504,804 B2 | * | 3/2009 | Johnson et al. ............... 320/150 |
| 2002/0074971 A1 | * | 6/2002 | Hidaka et al. ................. 320/120 |
| 2005/0127873 A1 | * | 6/2005 | Yamamoto et al. ........... 320/116 |
| 2006/0103350 A1 | * | 5/2006 | Lai ................................. 320/118 |
| 2008/0238357 A1 | | 10/2008 | Bourilkov et al. |
| 2008/0278115 A1 | * | 11/2008 | Huggins ........................ 320/134 |

OTHER PUBLICATIONS

David Linden, "Handbook of Batteries," McGraw-Hill, 2nd Ed., pp. 1.9-1.11; 7.3-7.7; 11.79-11.81; 12.1-12.16; and 23.3-23.12 (1995).
S. Uno Falk et al., "Alkaline Storage Batteries," John Wiley & Sons, Inc., pp. 1-41 (1969).
Global Sources, HCT Electric Co Ltd., Battery Charger, http://www.globalsources.com/gsol/I/Standard-battery/p/sm/1002739242.htm, Undated.
Made-In-China.com, Lead-Acid Battery Charger, http://www.made-in-china.com/china-products/productiveiewafREyAncjJgK/Lead-Acid-Battery-Charger.html, 2008.
Omron Product Display, S8E3 Compact, Economical, 3-point Switching Power Supply, http://omrwsc.am.omron.com/webapp/wcs/stores/servlet/ProductDisplay?catalogId=10001&storeId=10001&product=34497&langId=-1&categoryId=16840, 2006.

* cited by examiner

*Primary Examiner* — M'Baye Diao
(74) *Attorney, Agent, or Firm* — Fish & Richardson P.C.

(57) ABSTRACT

A battery charger containing circuitry including integrated cell balancing and automatic cell configuration determination is presented. The charger automatically adapts output current to different battery configurations. The charger also ensures that all the cells within a battery configuration are at roughly the same voltage.

20 Claims, 6 Drawing Sheets

BATTERY CHARGER WITH INTEGRATED CELL BALANCING

CROSS-REFERENCE TO RELATED APPLICATIONS

This application claims priority to U.S. Provisional Application Ser. No. 60/944,150, entitled "Battery Charger with Integrated Cell Balancing" and filed on Jun. 15, 2007, the content of which is hereby incorporated by reference in its entirety.

BACKGROUND

Rechargeable batteries are typically charged by a source of constant voltage/constant current CV/CC) with crossover voltage, e.g., 3.7 V. Initially the battery is charged using a constant current (i.e., in CC mode) until the crossover point is reached (e.g., 3.7V), at which point the charger switches to constant voltage mode to maintain the voltage at the terminal of the rechargeable battery at substantially about the crossover voltage. The charging period required to achieve 90-100% capacity is typically 2-4 h, with the CC stage being around 40 minutes at 1 C charging rate (i.e., a charging rate corresponding to a charging current level that would charge a battery in one hour). Generally, at the conclusion of the CC stage the rechargeable battery achieves a charge level of 60-70% of the charge capacity of the battery. The CV stage of the charging process generally take 1-3 hours to complete. During that time the charging current level decreases and typically reaches a level corresponding to a charge rate of 0.1 C by the time the charging process is concluded.

One factor limiting the expediency of the charging rechargeable batteries is the danger of causing the charger and/or battery to overheat. Such overheating may damage the charger and/or battery, and further pose a safety risk. Consequently, conventional chargers are configured to apply charging current corresponding to charge rates of about 1 C. To protect against overheating conditions, temperature sensors are sometimes used to monitor the temperature of the charger and/or the battery, thus enabling the charger to undertake remedial or preemptive actions in the event of the detection of overheating conditions (e.g., terminating the charging current if the battery's temperature exceeds a safety limit of, for example, 45° C.)

SUMMARY

In one aspect, a battery charger includes circuitry with integrated cell balancing and automatic cell configuration determination that automatically adapts output current to different battery configurations.

The following are embodiments within the scope of this aspect.

The integrated cell balancing within the battery charger may include a regulated switching power supply to charge a pack of cells, which maybe either a one series (1S), two series (2S), three series (3S), or four series (4S). The cell balancing may continuously attempt to bring all the cells to the same voltage, by applying a resistive load to all but the cell with the smallest voltage in the pack. The integrated cell balancing within the battery charger may include a controller that monitors electrical and temperature conditions inside the charger, maintains proper individual cell voltages, detects fault conditions and displays charger status and charge progress. The battery charger may include circuitry to sense the battery voltage on output terminals of the charger and the individual cell voltages on inter-cell connection ports. The battery charger may determine the battery configuration connected to the charger and adjust the output voltage and balancing according to the determined configuration. The battery charger may monitor individual cell voltages to maintain all cell voltages equal to each other within a specified tolerance. The battery charger may include a first connector for the main charge path; and an auxiliary connector attached to inter-cell points in the pack to the charger for balancing and individual cell voltage monitoring. The battery charger may sense how many inter-cell connections are attached to the charger and determines how many cells are in series in the pack. The battery charger may use inter-cell connections to drain small amounts of current from the higher voltage cells to accomplish cell voltage balancing. The circuitry of the battery charger may sample input and output cell voltages and an inductor current at regular time intervals. The battery charger may determine the number of cells connected to the charger by measuring the impedance across each possible cell connection, with a high impedance between two terminals indicating no cell connected to the terminals and a low impedance along with at least a volt of dc voltage indicating a cell connected to those terminals. The battery charger may be configured such that if the charger senses that one of the cells in the string is at or above its target value, the charger adjusts the total output voltage lower to keep that cell at its target value to drain current from that cell that is at or above the target voltage value. The battery charger may be configured to perform cell balancing and configuration determination about every millisecond. The battery charger may have a resistive load applied to the cells by turning on a transistor that connects a resistor across the terminals of the higher-voltage cell, with the value of the resistor determining a balancing current. The battery charger may perform no balancing action if the cell voltages are within 10 millivolts of each other. The battery charger may include a thermistor or other temperature sensing component disposed inside the charger near the charger's hottest power components.

In an additional aspect, a battery charger includes circuitry to sense battery voltage on output terminals of the charger, circuitry to sense individual cell voltages on inter-cell connection ports of the charger, and circuitry to determine whether one of the cells in the string is at or above its target value, and to adjust the total output voltage lower to keep that cell at its target value to drain current from that cell that is at or above the target voltage value.

In an additional aspect, a battery charger includes circuitry to charge a nanophosphate cell in about 15 minutes, the circuitry including integrated cell balancing and with the circuitry automatically adapting to different connected battery configurations.

One or more of the foregoing aspects may provide one or more of the following advantages.

Because LFP chemistry is robust and can accept fast charge current, the charger is capable of recharging such a battery in about 15 minutes. However, in order to raise the current limit, the power components would have to be increased in size and capability in order to handle the higher currents and power levels. Charge balancing of different cell configurations is integrated into the charger. The charge balancing continuously attempts to bring all the cells in a pack of cells to the same voltage whether the pack is fully charged or not. The charge balancing mitigates against over heating and/or overcharging of the cells.

The details of one or more embodiments of the invention are set forth in the accompanying drawings and the descrip-

DETAILED DESCRIPTION

Figure 1:
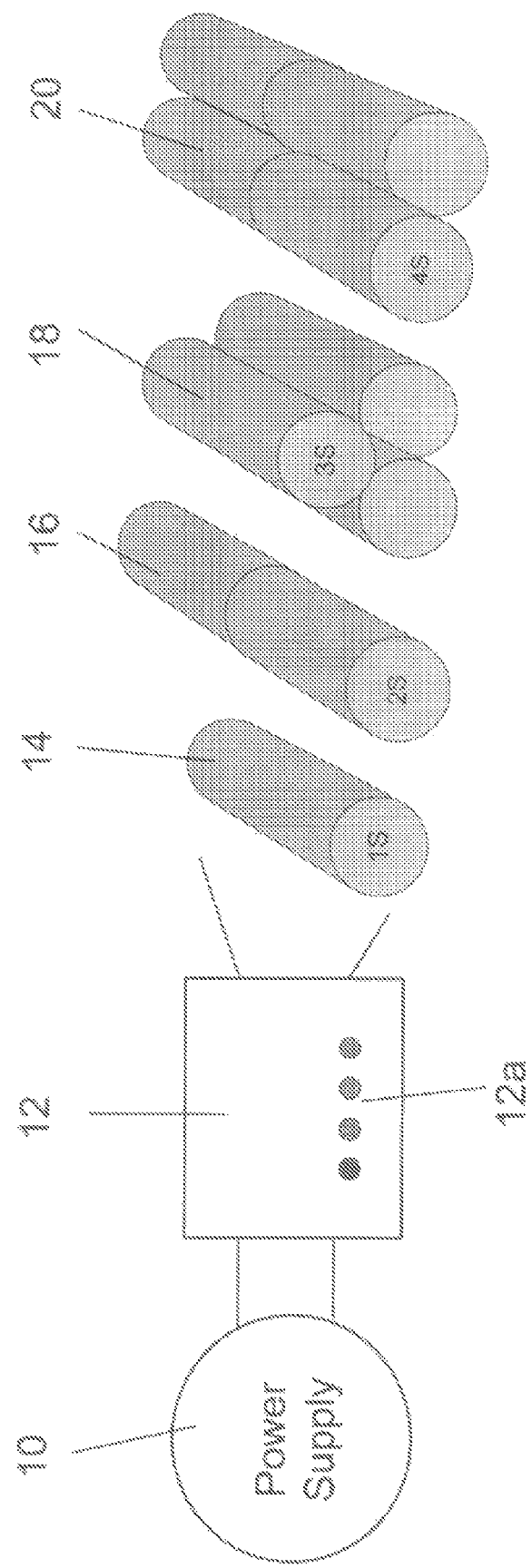
FIG. 1 shows a block diagram of a charger that automatically adapts to different output battery configurations.

Referring now to FIG. 1 a charger 12 configured to charge a rechargeable battery 130 having at least one rechargeable electrochemical cell. Exemplary cells are those based on lithium-iron-phosphate (LiFePO$_4$) chemistry and in particular high-power lithium ion batteries using A123 proprietary Nanophosphate™ technology and available from A123 Systems, Inc. Arsenal on the Charles 321 Arsenal Street Watertown, Mass. 02472.

Such a battery (which is sometimes referred to as a secondary battery) includes cells having, in some embodiments, lithium titanate anode material, and lithiated-iron-phosphate cathode materials adapted to enable fast recharge of rechargeable batteries based on such materials. LiFePO$_4$ chemistry has low internal resistance (R) and therefore heat losses resulting from the internal resistance for batteries based on such chemistry, which are proportional to power losses ($I^2R$, where I is the charging current applied to the battery) will be small. Because of the low internal resistance of batteries based on LiFePO$_4$ chemistry, such battery can accept large charging currents. The details of Nanophosphate™ technology chemistry and its role in improved electrical conductivity of lithium battery electrodes may be found in U.S. Pat. No. 7,338,734, which is incorporated here in its entirety by reference.

The battery charger 12 has integrated cell balancing that automatically adapts to different output battery configurations. The battery charger 12 with integrated cell balancing (hereinafter charger 12) includes a regulated switching power supply capable of accepting an input voltage from a DC power source 10 such as a 12V battery, and charging a either a one series 14 (1S), two series 16, (2S), three series 18 (3S), or four series 20 (4S) pack of "M1" cells a configuration of battery cells obtainable from A123 Systems Watertown Mass. Other cell configurations and other Nanophosphate™ technology or LiFePO$_4$ cell types can be used. The power supply 10 is controlled by a microprocessor which monitors the electrical and temperature conditions inside the charger 12, maintains proper individual cell voltages, detects fault conditions and displays the charger status and charge progress.

The charger 12 provides easy operation with as little human intervention as possible yet is versatile enough to charge a 1S 14, 2S 16, 3S 18, or 4S 20 pack automatically. It does this by first sensing the battery voltage on the main output terminals and the individual cell voltages on the inter-cell connection port (described below). The charger 12 determines what battery configuration is connected and adjusts the output voltage and balancing strategy accordingly. Whenever there is a valid input power supply 10 and a compatible battery 14, 16, 18, or 20 connected, the charger 12 monitors the individual cell voltages and attempts to keep all the cell voltages equal to each other.

The charger 12 activates status lights 12a during the charge process to indicate heavy charging, light charging plus balancing, charge complete and error modes. In addition, a charger microcontroller, e.g., a microcontroller, a microprocessor, state machine and so forth (not shown in FIG. 1) within the charger 100 monitors temperature and voltages and takes appropriate actions such as shutting down or reducing current to prevent damage to the charger 12 or the battery 14, 16, 18, or 20.

Figure 2:
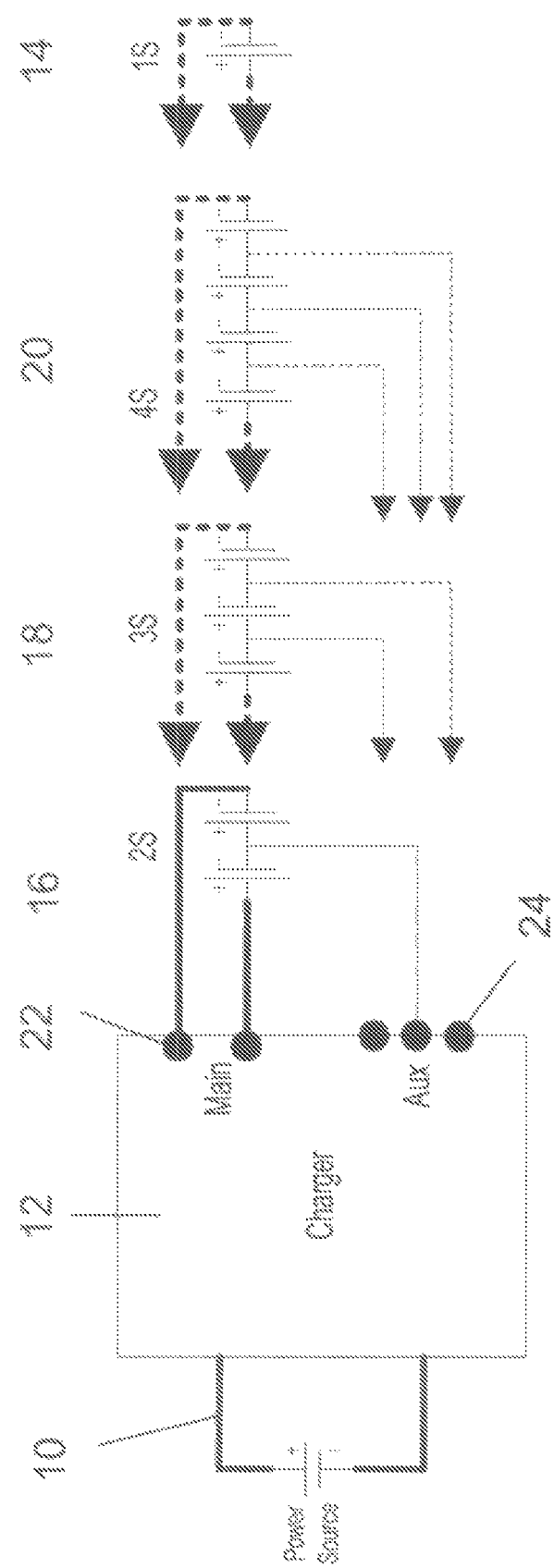
FIG. 2 is a schematic of charger connections showing alternative battery configurations.

Referring to FIG. 2, charger connections for alternative battery configurations 14, 16, 18, and 20 are shown. The input connects to, e.g., a 10-15V power source 10 typically a 12V battery—by clamping onto its terminals with, e.g., alligator clip type connectors. Other DC sources can be used, e.g., a power pack that is supplied AC voltage and converts it to a suitable DC voltage. An input diode 28 (FIG. 3) prevents damage from a reverse polarity mistake. The battery 14, 16, 18, or 20 is connected to the output through a connector 22, e.g., a "Dean-type" connector for the main charge path. An auxiliary connector 24 attaches the inter-cell points in the pack to the charger 12 for balancing and individual cell voltage monitoring.

Figure 3:
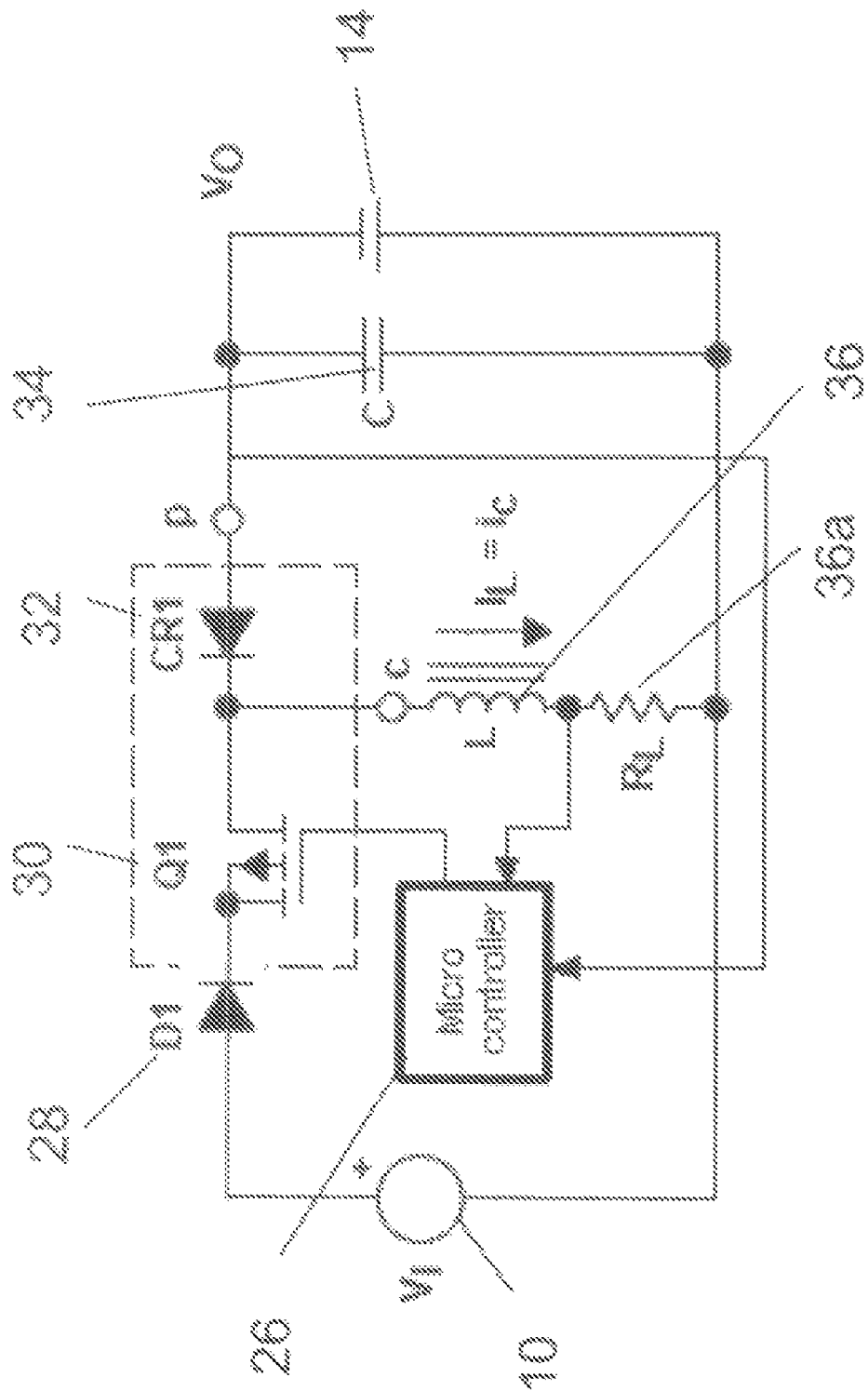
FIG. 3 is a schematic showing components of the charger's power stage.

Referring now to FIG. 3, components of the charger's power conversion stage are shown. The power conversion stage converts incoming unregulated DC voltage between, e.g., 10 and 15V to a regulated voltage compatible with the detected battery configuration on the output. The power conversion stage includes a single stage buck-boost switching regulator circuit that is controlled by the charger microcontroller 26 that was discussed previously. The charger microcontroller 26 typically will include non-volatile memory storing firmware to cause the charger microprocessor to perform the above functions. The charger microprocessor can be a digital processor, digital signal processor, a microprocessor, hard-wired controller, and so forth.

The power circuits include an input diode 28 (D1), to prevent problems due to mis-wiring, a series switch 30 (Q1) that turns on and off, e.g., about 125 thousand times a second, an inductor 36 (L) with inductor DC resistance 36a to store energy between switch cycles, an output diode 32 (CR1) to transfer energy from the inductor to the output. The output diode 32 only conducts for a portion of the switch cycle. Note that the input power supply 10 has voltage V1, and output load 14 (or 16, 18, or 20) has a voltage Vo. Also note that, although the inductor 36 is connected to the capacitor 34 when the output diode 32 is conducting, an effective LC filter is formed such that a train of input voltage pulses is converted to a DC output voltage.

For more details on a Buck Boost power supply, see Application Report SLVA059A—"Understanding Buck-Boost Power Stages in Switch Mode Power Supplies" by Everett Rogers, March 1999—Revised November 2002, which is incorporated herein by reference in its entirety.

The charger microprocessor senses current and voltage and adjusts the ratio of on-time vs. off-time of series switch 30 to control the output voltage and current into the charging battery. There are two limits that the charger microprocessor controls in its output, a voltage limit and a current limit. During recharge, if the battery's voltage is below that of the voltage limit, the controller limits the current going into the battery. During this constant current mode, the current going into the battery is relatively steady at the current limit level, while its terminal voltage steadily climbs. When the battery is mostly recharged, its voltage reaches the voltage limit, at which point the charger microprocessor, now in constant voltage mode, limits the voltage going into the battery. During this constant voltage mode, the output voltage is constant, while the output current steadily declines to zero.

The bulk of the charge transferred to a connected battery occurs in the constant current mode of recharge. The amount of charge transferred is the integration of current over the time. In the case of a relatively constant current, the integration is simply a multiplication of current by time. So in order to transfer a charge C in T time, one needs to set the current (I) to C/T, since C=I×T in a constant current charging mode. In this particular charger, the current limit is set to about (4/hour) *C rating of the battery. For example, for a 26650 battery (obtainable from A123 Inc.) (4/hour)*2.3 amp-hour is about 10 amps (actually 9.2 amps). In other words, 10 amps going into a 2.3 amp-hour battery will charge the battery in about a quarter of an hour or 15 minutes. Once the output voltage limit is reached, the output current tails off non-linearly with time, but essentially, most of the charge is replenished in the battery. Charge completely finished, when the charge current naturally falls to zero while holding its terminal voltage at, e.g., 3.5V or so (for Lithium Iron Phosphate LFP batteries).

Because LFP chemistry is robust and can accept fast charge current, the charger is capable of recharging such a battery in about 15 minutes. The charge time is dependent on the recharge current limit set in the charger controller. By way of example, a 5 minute charger can also be provided by simply increasing the current limit to (12/hour)*C or 30 amps. However, in order to raise the current limit, the power components would have to be increased in size and capability in order to handle the higher currents and power levels.

Figure 4:
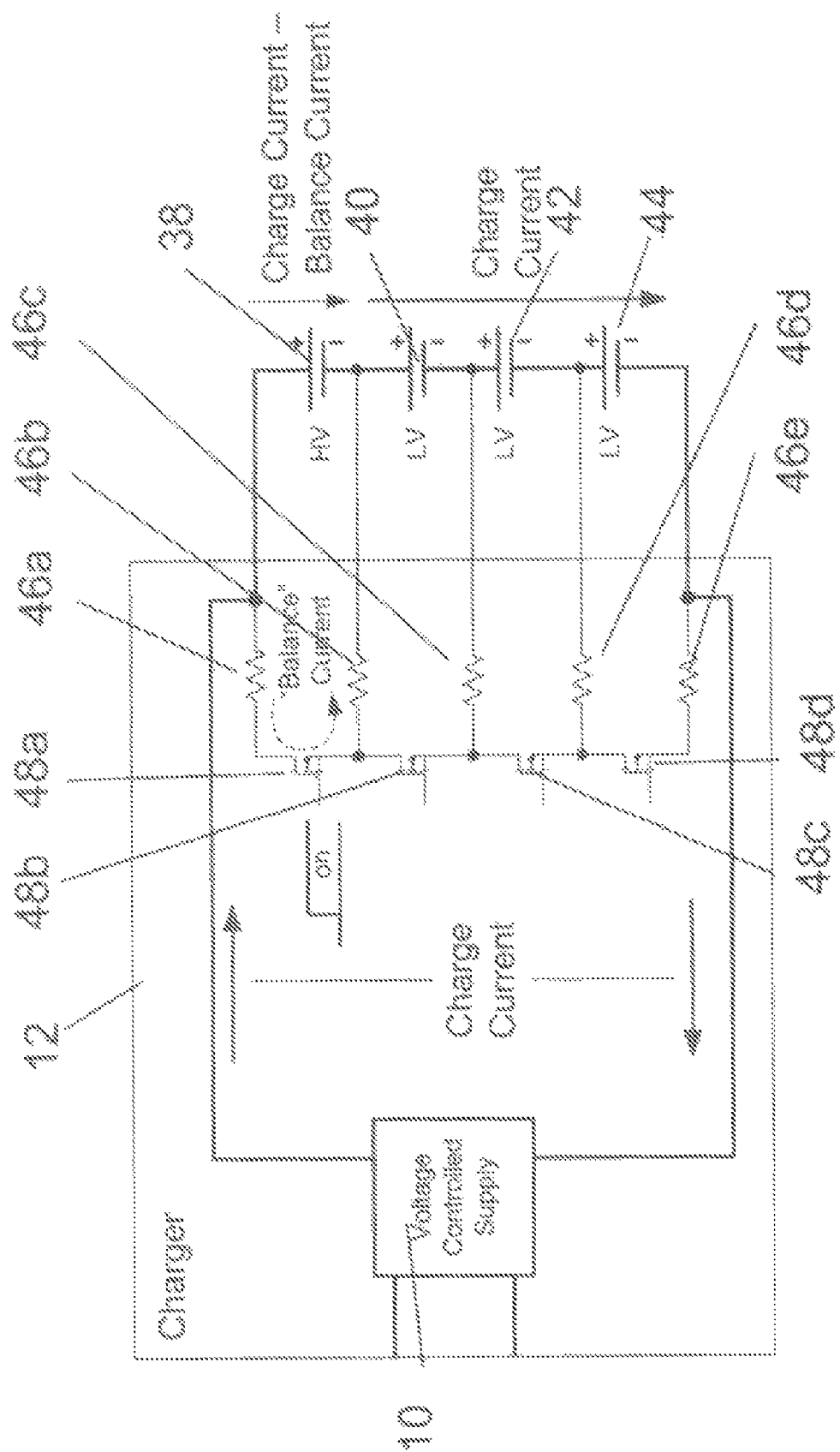
FIG. 4 is a schematic showing balancing integrated into charger.

Referring now to FIG. 4, a charge balancing of different cell configurations is integrated into the charger, as shown. The charger continuously attempts to bring all the cells (in this example, in a 4S pack) to the same voltage, by applying a resistive load 46a-e to all but the cell with the lowest voltage in the pack. When the cell voltages are within 10 millivolts of each other no balancing action is performed. The sensing and balancing actions are performed, e.g., every 200 milliseconds whenever the input voltage is within range, or there are no other errors detected in the system or connections. It also continues to balance the cells whether the pack is fully charged or not.

The resistive loads 46a-e are applied to the cells by turning on a corresponding transistor 48a,b,c, or d that connects a resistor 46a, b, c, d, or e across the terminals of the higher-voltage cell 38. The value of this resistor determines how much balancing current can be achieved while the power dissipating qualities of the resistors 46a-e and the switching transistors 48a-d need to be capable of this balancing current.

The charger microcontroller 26 senses how many inter-cell connections are attached to the charger 12 and determines how many cells are in series in the pack 14, 16, 18, or 20. (Again, in this case, 4S pack 20 is illustrated.) The charger 12 uses these inter-cell connections to drain small amounts of current from higher-voltage cells to lower-voltage cells for cell balancing. The charger microcontroller 26 samples the input and output cell voltages and the inductor current. This sampling of the input and output voltages may be done at regular timer intervals, e.g., every millisecond. Alternatively, voltage sampling intervals may be based on a comparison between an instantaneous voltage level and a reference voltage set by the charger microcontroller. For example, a sample may take place each time the difference between the instantaneous voltage level and the reference voltage is below some threshold, e.g., about 10 mV. Alternatively, the voltage sampling intervals may be based on a comparison of voltage rise times to over cycle times set by the charger microcontroller. For example, a voltage sample may take place when the voltage rise time exceeds the cycle time.

The charger determines how many cells are connected to the charger by measuring the impedance across each possible cell connection. A high impedance between two terminals indicates that there is no cell connected to them whereas, a low impedance along with at least some minimum dc voltage, e.g., 1 volt of dc voltage, indicates a cell is connected to those terminals. The number of cells determined to be connected on the output will affect how much voltage is demanded at the battery pack's terminals.

The charger microcontroller 26 also samples the temperature near the power components and takes a reading on the status of the connections to the battery pack. This sampling of the temperature may be done at regular timer intervals, e.g., about 200 milliseconds. The charger 12 also includes a thermistor or other temperature sensing component that is disposed inside the charger near the charger's hottest power components. The charger 12 monitors the thermistor five times every second for changes in resistance that would correspond to changes in temperature. When this temperature is determined to exceed a first predefined limit, the microprocessor or other components cause the charger to cease producing output current until the temperature falls to a second predefined temperature below the first predefined temperature. The temperatures are selected in accordance with the temperature tolerances for the components used in the charger.

The charger 12 also monitors the input voltage and will shut off the charge current if the input voltage is above, e.g., 15V or below, e.g., 10V. The charger 12 typically regulates the output voltage to precisely control the cell voltages. However, if for some reason, the output voltage rises out of control above a safe operating point, the charger 12 will shut down the output current. The charger 12 also verifies that the battery pack connections are made correctly. The charger 12 checks for reversed inter-cell connections or missing connections. If any problems are detected it will light the error indicator in the status lights 12a and cease charging current.

Figure 5:
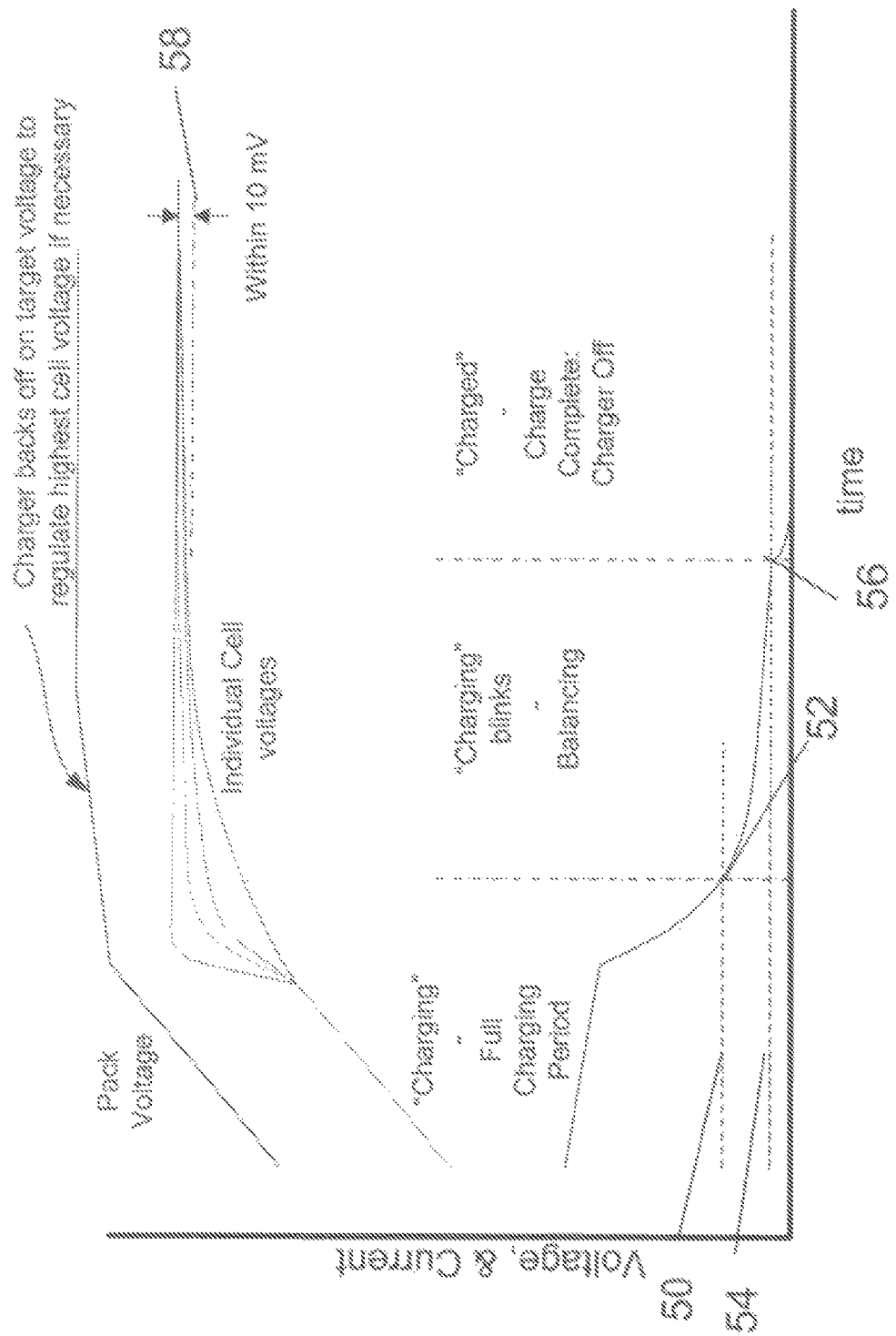
FIG. 5 is a plot of charging voltage and current vs. time showing balancing stage and indications.

Referring now to FIG. 5, a plot of charging voltage and current vs. time, along with balancing stage and indications is shown. The charger monitors the output current fed into the batteries and the balancing circuits. If the output current is less than, e.g., about 100 milliamps, the charge complete light within the status lights 12a will be lit. At this point charge current is shut off completely, but balancing may be ongoing. If the output current is, e.g., more than about 100 milliamps but less than about 200 mA, and the pack voltage is less than its nominal target value (either 3.6 V, 7.2 V 10.8 V, or 14.4 V), the light charging plus balancing and heavy charging lights within the status lights 12a will blink. In this mode, the charger output current has been throttled back in order to prevent overcharging one or more cells while the cells are brought into balance.

The charging current vs. time plot in FIG. 5 reflects this description. The current threshold 50 represents the transition from the heavy charging to the light charging plus balancing modes, and takes place at an instant of time 52. The smaller current threshold 54 represents the transition between light charging, balancing and charged modes, and takes place at a later instant of time 56.

As for the charging voltage vs. time plot, at the instant of time 52, in the beginning of the balancing stage, the charger must control the increase in the overall pack voltage because the highest voltage in the cell is being regulated. Once balancing is achieved at time instant 56, the individual cell voltages are within, e.g., 10 mV of each other and the target voltage has been achieved.

Figure 6:
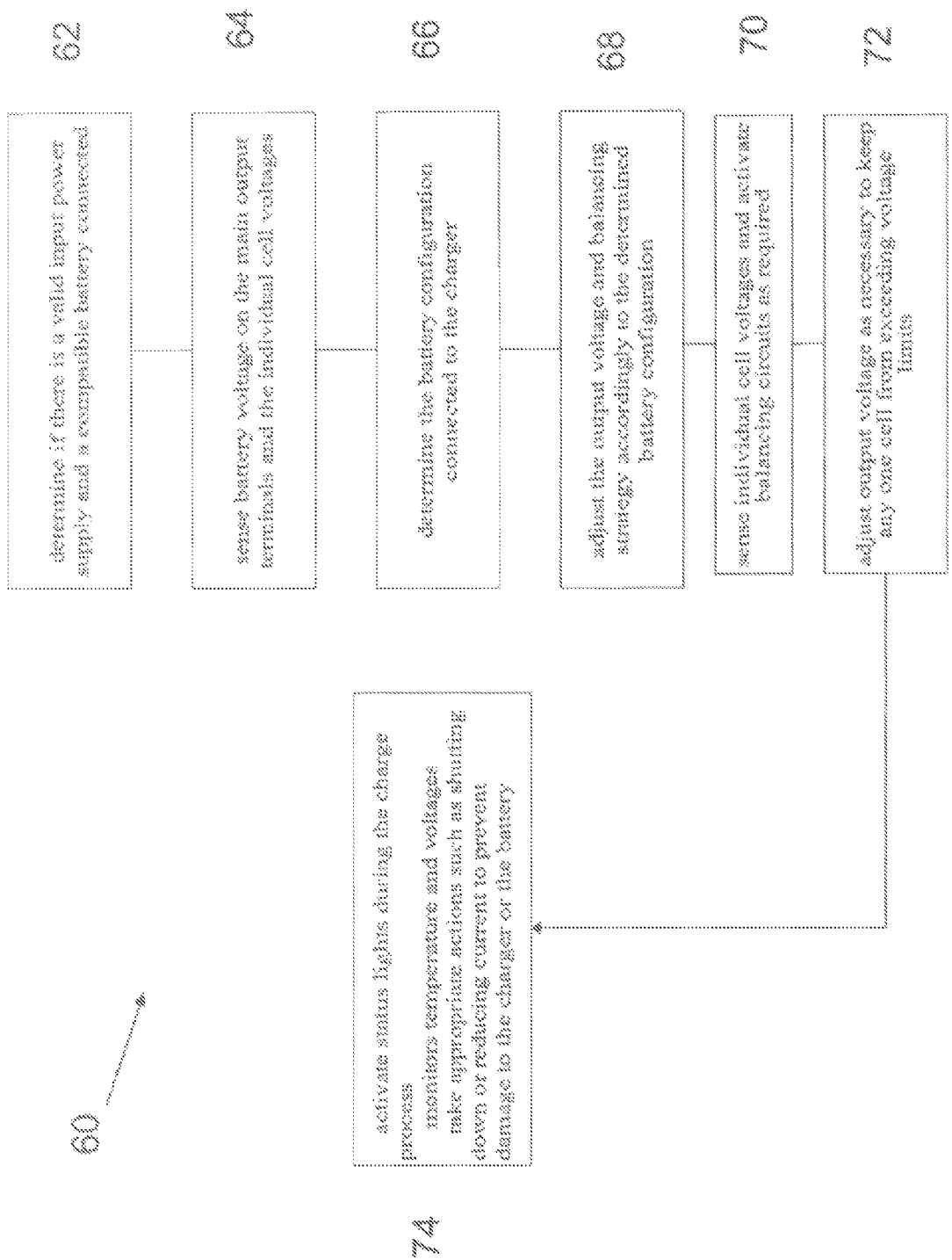
FIG. 6 is a flow chart depicting exemplary charging operation of the charger.

Referring now to FIG. 6, a typical charging regimen 60 for the charger 12 is shown. The charging regimen 60 determines 62 if there is a valid input power supply and a compatible battery connected. The charging regimen 60 controls charging by sensing 64 battery voltage on the main output terminals and the individual cell voltages on the inter-cell connection ports. The charging regimen 60 then determines 66 the battery configuration connected to the charger 12. The charging regimen 60 then adjusts 68 the output voltage and balancing strategy accordingly to the determined battery configuration. The charging regimen 60 next senses 70 individual cell voltages and activates balancing currents as needed. The charging regimen 60 then adjusts 72 the output voltage as necessary to keep any one cell from exceeding voltage limits.

The charging regimen 60 activates 74 status lights during the charge process, as discussed above. The charger monitors temperature and voltages and takes appropriate actions such as shutting down or reducing current to prevent damage to the charger or the battery if these are exceeded.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A battery charger, comprising:
   circuitry to sense battery voltage on output terminals of the charger and
   circuitry to sense individual cell voltages on inter-cell connection ports of the charger;
   circuitry to determine whether one of the cells in a cell pack is at or above a target value, and to adjust a total output voltage lower to keep that cell at the target value by draining current from that cell; and
   a first connector for a main charge path; and an auxiliary connector configured to be attached to inter-cell points in the pack for cell balancing and individual cell voltage monitoring.

2. The battery charger of claim 1 further comprising a regulated switching power supply to charge the cell pack.

3. The battery charger of claim 2, wherein the cell pack is selected from a group consisting of: a one series (1S), a two series (2S), a three series (3S), and a four series (4S).

4. The battery charger of claim 2, wherein at least one of the circuitries includes:
   a resistive load network including individual resistors, each individual resistor connected in parallel across each cell in the cell pack to all but a cell with the smallest voltage in the pack wherein cell balancing continuously attempts to bring all the cells in the cell pack to a same voltage by drawing current from the cells with a higher charge, until all cells have a same amount of stored charge.

5. The battery charger of claim 1 further comprising a controller that monitors electrical and temperature conditions inside the charger, maintains proper individual cell voltages, detects fault conditions and displays charger status and charge progress.

6. The battery charger of claim 1 wherein the charger determines the battery configuration connected to the charger and adjusts an output voltage and balancing according to the determined configuration.

7. The battery charger of claim 1 wherein the charger senses how many inter-cell connections are attached to the charger and determines how many cells are in series in the pack.

8. The battery charger of claim 1 wherein the charger uses the auxiliary connector to drain small amounts of current from higher voltage cells to accomplish the cell balancing.

9. The battery charger of claim 1 wherein the charger samples input and output cell voltages and an inductor current at regular time intervals.

10. The battery charger of claim 1 wherein the charger determines a number of cells in the pack by measuring impedance across each possible cell connection, with a high impedance between two terminals indicating no cell connected to the terminals and a low impedance along with at least a volt of dc voltage indicating a cell connected to those terminals.

11. The battery charger of claim 1 wherein if the charger senses that one of the cells in the pack is at or above a target value, the charger adjusts a total output voltage lower to keep that cell at the target value by draining current from that cell.

12. The battery charger of claim 1 wherein the cell balancing and voltage monitoring is done about every millisecond.

13. The battery charger of claim 1 wherein a resistive load is applied to the cells by turning on a transistor that connects a resistor across terminals of a higher-voltage cell, with a value of the resistor determining a balancing current.

14. The battery charger of claim 1 wherein if the cell voltages are within 10 millivolts of each other the cell balancing is not performed.

15. The battery charger of claim 1 wherein the charger includes a thermistor or other temperature sensing component disposed inside the charger near the charger's hottest power components.

16. A battery charger, comprising:
   circuitry to sense battery voltage on output terminals of the charger and
   circuitry to sense individual cell voltages on inter-cell connection ports of the charger;
   a resistor;
   a transistor coupled to the resistor;
   circuitry to apply a resistive load of the resistor to a selected one or ones of the cells of a cell pack by turning on the transistor that connects the resistor across the terminals of a higher-voltage cell, with a value of the resistor determining a balancing current; and
   a first connector for a main charge path; and an auxiliary connector configured to be attached to inter-cell points in the pack for cell balancing and individual cell voltage monitoring.

17. A battery charger, comprising:
   circuitry to charge a nanophosphate cell in about 15 minutes, the circuitry including integrated cell balancing and with the circuitry automatically adapting to different connected battery configurations; and
   a resistive load network including individual resistors, each individual resistor having a distinct resistance that is variably adjusted and inserted in series between each cell in the cell pack to all but a cell with the smallest voltage in the pack wherein cell balancing continuously attempts to bring all the cells in the cell pack to a same voltage by varying each resistance corresponding to an individual resistor in the resistive load network.

18. The battery charger of claim 17 wherein the integrated cell balancing includes a regulated switching power supply to charge the cell pack.

19. The battery charger of claim 18, wherein the pack of cells can be selected from a group consisting of a one series (1S), a two series (2S), a three series (3S), and a four series (4S).

20. The battery charger of claim 17 wherein the integrated cell balancing includes a controller that monitors electrical and temperature conditions inside the charger, maintains proper individual cell voltages, detects fault conditions and displays charger status and charge progress.

* * * * *